Figure 1:
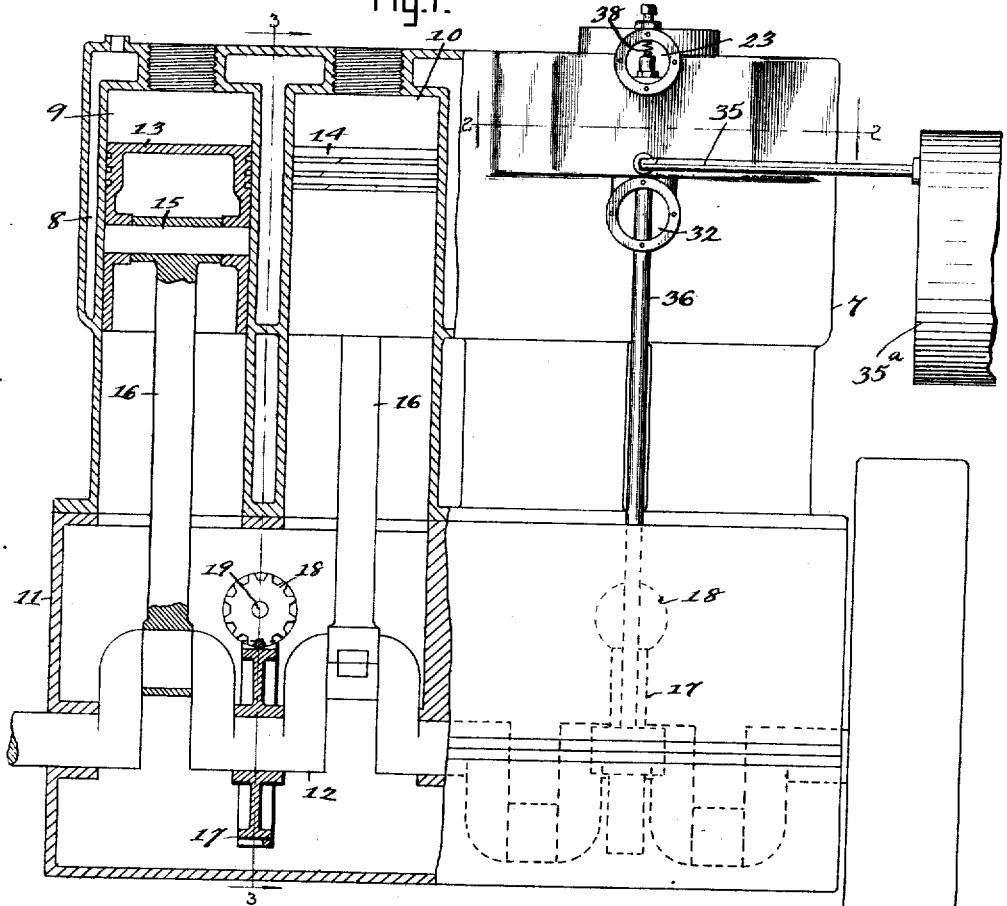

A. H. FORSYTHE.
INTERNAL COMBUSTION ENGINE.
APPLICATION FILED JAN. 20, 1915.

1,212,041.

Patented Jan. 9, 1917.
2 SHEETS—SHEET 1.

WITNESSES

INVENTOR
Albert H. Forsythe
BY
ATTORNEYS

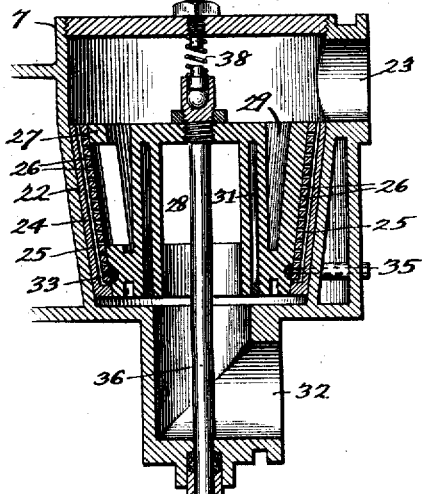
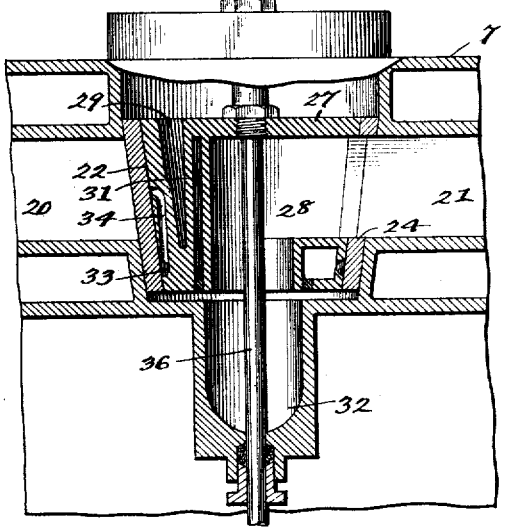
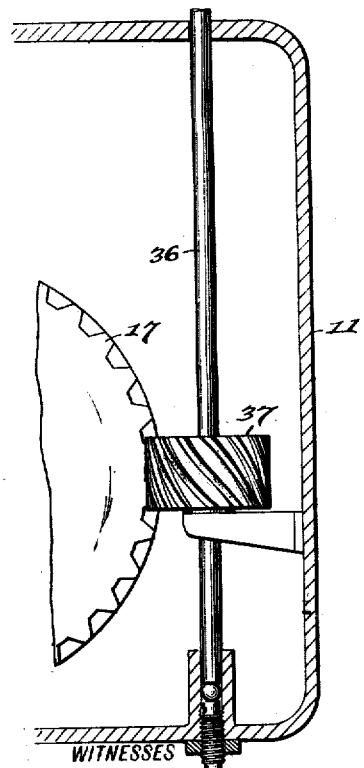
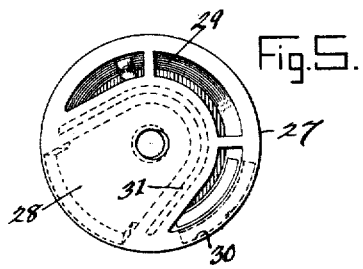
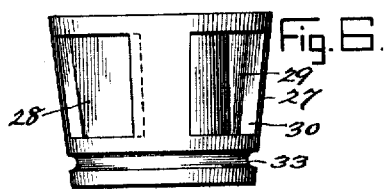

UNITED STATES PATENT OFFICE.

ALBERT H. FORSYTHE, OF JOPLIN, MISSOURI.

INTERNAL-COMBUSTION ENGINE.

1,212,041. Specification of Letters Patent. Patented Jan. 9, 1917.

Application filed January 20, 1915. Serial No. 3,262.

*To all whom it may concern:*

Be it known that I, ALBERT H. FORSYTHE, a citizen of the United States, and a resident of Joplin, in the county of Jasper and State of Missouri, have invented certain new and useful Improvements in Internal-Combustion Engines, of which the following is a specification.

My invention relates to internal combustion engines, and is an improvement over the form shown and described in Letters Patent of the United States issued to me on the 12th day of December, 1911, No. 1,011,601, and one of the main objects thereof is to provide such an engine in which the cylinders have but one port, each, adapted for communication with the intake and exhaust passages of a rotary valve alternately; in which the valve is vertically arranged and of conical formation, whereby unequal expansion of the valve and its seat is automatically compensated for; in which the heated exhaust gases are practically surrounded by cool air or mixture on their outward passage through the valve; in which a layer of dead air is interposed between the intake and exhaust gases in the valve; in which means are provided for compressing air for storage in a tank; and which may be started by means of such compressed air.

My invention is fully described in the following specification, of which the accompanying drawings form a part, in which like reference characters are used to designate like parts in each of the views, and in which:—

Figure 2:
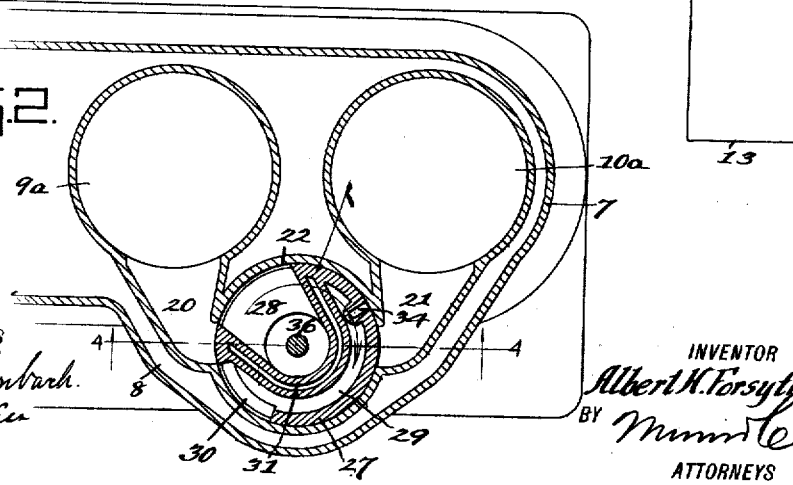

Figure 1 is a side elevation of an engine constructed in accordance with my present invention, partly in longitudinal, central, vertical, section through two cylinders; Fig. 2 is a section taken on the line 2—2 of Fig. 1; Fig. 3 is a section taken on the line 3—3 of Fig. 1; Fig. 4 is a section taken on the line 4—4 of Fig. 2; Fig. 5 is a top plan view of my valve; and Fig. 6 is a side elevation thereof.

In the drawings forming a part of this application I have shown a present preferred form of embodiment of my invention, comprising a cylinder casing 7, provided with a water-jacket 8, for four cylinders as shown, only two of which, 9 and 10, are shown in detail, said casing being mounted upon a crank-case 11 in which is a crank-shaft 12 carrying the fly-wheel 13. The cylinders are arranged in pairs, and it will be seen, from Fig. 1, that the cranks on the shaft 12 are on the same side of said shaft and in the same plane for each pair of cylinders.

Each cylinder is provided with a piston, 13 and 14, respectively, connected with the respective cranks by means of the usual pins 15 and connecting rods 16, and said shaft 12 also carries a worm-gear 17 between the cranks of each pair, only one of which is shown in detail, and said gears may be in operative connection with worms 18 on shafts 19 adapted for connection with a magneto, pump gear, or the like, not shown. The cylinders have, each, a port 20 and 21 for the cylinders of each pair, said ports communicating with a vertically arranged, conical, chamber 22 at substantially diametrically opposed points but for only a portion of the height thereof, as shown in Fig. 4, the upper portion of said chamber being in communication with the intake 23, Fig. 3, directly. Seated in said chamber is a conical sleeve 24 ported in the positions of the ports 20 and 21 and immovable in said chamber, said sleeve having two longitudinal bores 25 therein from the top downward and a plurality of horizontal bores 26 from the interior of said sleeve to said longitudinal bores, whereby oil may pass to the interior walls thereof to lubricate a rotary valve 27, also of conical form, which is rotatably seated in said sleeve.

The valve 27 is divided into a wedge shaped compartment 28 from the center to the periphery thereof, a segmental compartment 29 around the compartment 28 and open at a port 30 to the periphery of the valve, the central lines through the opening of the compartment 28 and through the port 30 being at an angle of approximately 90 degrees of a circle, as clearly shown in Fig. 2, and I interposed a sealed, dead air, chamber or compartment 31 between the compartments 28 and 29; it is here pointed out that the sleeve 24 has been omitted from Fig. 2 to avoid a complex showing and description.

As clearly shown in Fig. 4, the compartment 28 is adapted for communication with the ports 20 and 21 of the corresponding cylinders, alternately, and is constantly in communication with the exhaust 32, Fig. 3, whereas the compartment 29 is always in communication with the upper part of the valve chamber 22 and, thus, with the intake 23, as shown in Fig. 3.

The valve 27 is peripherally grooved adjacent its lower end at 33, Figs. 3, 4, and 6, which groove communicates with a passage 34 in the wall of the valve and opening outwardly thereof, Fig. 4, and said groove is in constant communication with a pipe 35 passed through the valve casing and contained sleeve 24, and which pipe may be connected with a suitable tank 35ª. The valve 27 is carried at the upper end of a stem 36 which carries a worm 37 adjacent its lower end enmeshed with the worm-gear 18 of the respective pair of cylinders, the description of one pair of cylinders, valve, and connected parts being applicable to the other pair, except as to the relative positions of the cranks, pistons, and valves, and I provide suitable anti-frictional end bearings for the valve-stem and an adjustable, spring actuated, thrust at the top thereof, of any desired construction, as shown at 38, Fig. 3. Assuming the valve 27 for the left-hand pair of cylinders 9 and 10 to be in the position shown in Fig. 2; this would insure extreme upward positions of the pistons of these cylinders, and extreme downward positions of the pistons of the right-hand cylinders, 9ª and 10ª; the gases from the cylinders 9 and 10 have just been exhausted into the compartment 28 and through the exhaust 32, and further valve rotation brings the ports 20 and 30 into conjunction, thereby admitting a charge of mixture to the cylinder 9; the charge in the cylinder 10, already compressed, is now ignited and the pistons in the cylinders 9 and 10 descend, the valve of these cylinders now having closed off the port 30 from the port 20 and brought the open side of the compartment 28 into conjunction with the port 21 of the cylinder 10; ignition now occurs in one of the cylinders 9ª or 10ª and the pistons therein descend, thereby forcing the pistons of the cylinders 9 and 10 upwardly; this exhausts the burnt gases in the cylinder 10 through the valve compartment 28 and compresses the charge in the cylinder 9, and which, being ignited, again forces the pistons in the cylinders 9 and 10 downwardly and those in the cylinders 9ª and 10ª upwardly, exhausting the gas from one and compressing the charge in the other of the last two. It will thus be seen that but one port is required for each cylinder, and but one valve for each pair of cylinders, and a simple, efficient, engine results. The relatively cool air in the sealed chamber 31 acts as an insulation against the heat from the exhaust gases, and the cool mixture in the compartment 29 aids in maintaining the valve and valve casing at a relatively low temperature, and this is further emphasized by means of the water-jacket 8, thereby preventing the heating of the parts. In the event of the unpreventable expansion of the valve over that of the valve seat, when the engine is in operation, the valve-stem also expands, thereby lengthening the same against the action of the thrust 38, and this moves the valve slightly upwardly with respect to its seat, and a new seat is thus formed, but the initial seat is resumed as soon as the parts cool, and it will thus be seen that an automatic compensation for unequal expansion of the valve and its seat results, due to the conical formation thereof. A valve may be provided in the air pipe 35 which may be actuated to admit compressed air from the reservoir 35ª into which it had been pumped to the respective cylinders alternately, and thus start the engine, and, while the engine is in operation, a portion of each explosion passes through the passage 34 of the valve, timed to be in communication with the exploding or firing cylinder, through the groove 33 and pipe 35 to the reservoir, not shown.

While I have shown a present preferred cylinder and valve construction and arrangement, I do not limit myself thereto, but may make changes thereover, within the scope of the following claim, without departing from the spirit of my invention, or sacrificing its advantages.

Having fully described my invention, what I claim as new, and desire to secure by Letters Patent, is:—

An internal combustion engine, comprising a casing provided with a plurality of cylinders arranged in pairs, a valve chamber for each pair of cylinders, a fuel intake, and a fuel exhaust, a conical valve in each chamber provided with ports and passages for alternately placing said fuel intake and fuel exhaust in communication with the respective cylinders, said valve being provided with a peripheral groove and a port adapted to place the same in communication with the respective cylinders alternately, and a pipe communicating with said groove and adapted for connection with a compressed air reservoir.

In testimony whereof I have signed my name to this specification in the presence of two subscribing witnesses.

ALBERT H. FORSYTHE.

Witnesses:
A. W. THURMAN,
CATHERINE H. SCOTT.